3,346,568
2-AMINO-5-SULFAMYL-BENZOIC
ACID HYDRAZIDES
Paul Schmidt, Therwil, Kurt Eichenberger and Max Wilhelm, Basel, and Alberto Rossi, Oberwil, Basel-Land, Switzerland, assignors to Ciba Corporation, New York, N.Y., a corporation of Delaware
No Drawing. Filed July 24, 1962, Ser. No. 212,130
Claims priority, application Switzerland, July 28, 1961, 8,917/61; Sept. 14, 1961, 10,636/61; Dec. 1, 1961, 14,013/61; Mar. 15, 1962, 3,140/62; June 22, 1962, 7,538/62
16 Claims. (Cl. 260—239.8)

The present invention relates to benzoic acid hydrazides that contain in 2-position an amino group and in 3-position a sulfamyl group substituted by at least one lower aliphatic hydrocarbon radical which may also be interrupted by hetero atoms or substituted by free hydroxyl, mercapto or amino groups or halogen atoms, or one cycloaliphatic or cycloaliphatic-aliphatic radical or one acyl radical, and of their salts.

The new compounds may contain further nuclear substituents, for example lower alkyl or alkoxy groups, more especially such as contain 1 to 4 carbon atoms, such as methyl, ethyl, propyl, isopropyl or butyl groups, or methoxy, ethoxy, propoxy or butoxy groups, also halogen such as fluorine, chlorine, bromine or iodine, or the pseudohalogen trifluoromethyl.

The hydrazino group is preferably unsubstituted but it can also be substituted, for example, by aliphatic, cycloaliphatic, araliphatic, heterocyclic-aliphatic, aromatic or heterocyclic radicals or by acyl radicals of the same kind, and these radicals may be linked by single or double bonds to the hydrazino group. Radicals of this kind are, for example, lower alkyls (such as those mentioned above), cycloalkyl, such as cyclopentyl or cyclohexyl, alkylidene such as ethylidene, propylidene-(1), or propylidene-(2), or butylidene bound in any manner, cycloalkylidene, such as cyclopentylidene, or phenylalkyl or phenylalkylidene such as benzyl, phenylethyl or benzylidene, heterocyclic radicals, such as pyridyl, furyl, tetrahydrofuryl or tetrahydropyanyl, or heterocyclylidene, such as 3-oxa-, 3-aza- or 3-thiocyclohexylidene, for example, N-methyl-piperidylidene-(4)-, or heterocyclyl-alkyl or -alkylidene such as pyridyl-methyl or -ethyl, pyridylmethylidene or furfurylidene or phenyl. Acyl radicals are, for example, lower alkoxy-carbonyl such as methoxy- or ethoxy-carbonyl, acetyl, propionyl, butyryl, pivalyl, valeroyl, caproyl, oenanthoyl, lauroyl, β-dimethylacryloyl, succinyl, phenylacetyl, cinnamoyl, benzoyl, phthaoyl, pyridoyl, furoyl, pyridylacetyl or thienylacetyl. In the afore-mentioned radicals aromatic rings may be further substituted, for example, by loweralkyl or lower alkoxy, methylenedioxy, halogen, trifluoromethyl, nitro or amino, for example dialkylamino such as dimethylamino or diethylamino. Aliphatic radicals may also contain, for example, hydroxyl, mercapto or amino groups, such as amino, particularly tertiary amino, such as dialkylamino, pyrrolidino, piperidino or morpholino, sulfonic acid groups or halogen atoms and are, for example 1-tertiary amino-propylidene-(2) radicals.

The amino group present in ortho-position of the new benzoic acid hydrazides is preferably unsubstituted but it can also be substituted, for example mono-substituted or di-substituted, above all by any one of the aliphatic or araliphatic groups listed above as possible substituents for the hydrazino group, more especially by lower alkyls such as methyl, ethyl, propyl, or butyl, by substituted lower alkyls such as hydroxy-alkyls or lower alkoxy-alkyls, for example hydroxyethyl or phenyl-lower alkyls such as benzyl groups in which the aromatic rings may be substituted, for example as mentioned above. As substituents of the amino group there are further suitable acyls, above all the acyl radicals mentioned above as suitable substituents for the hydrazino group, more especially the acetyl radical.

The lower aliphatic hydrocarbon radicals mentioned as substituents for the sulfamyl group are, for example, lower alkyl, alkenyl or if desired, alkylene radicals such as methyl, ethyl, propyl, or isopropyl, straight-chain or branched butyl, pentyl, hexyl or heptyl bound in any desired position, allyl or methallyl, butylene-(1:4), pentylene-(1:5), hexylene-(1:5), hexylene-(1:6) or heptylene-(2:6); aliphatic hydrocarbon radicals interrupted by hetero atoms such as oxygen, nitrogen or sulfur, or substituted by free hydroxyl, mercapto or amino groups or by halogen atoms, for example oxa, aza- or thia-alkyl or -alkylene groups, such as 2-methoxyethyl, 2-ethoxyethyl, 3-methoxypropyl, 2-methylmercaptoethyl, dialkylamino-, alkyleneamino-, oxa- or aza-alkylene-amino-alkyl radicals such as 2-dimethylamino-, 2-piperidino-, 2-morpholino- or 2-piperazino-ethyl, 3-oxa-, 3-aza- or 3-thiapentylene-(1:5), 3-methyl-, 3-ethyl-, or 3-hydroxyethyl-3-aza-pentylene-(1:5), 3-aza-hexylene-(1:6) or 4-methyl-4-aza-heptylene-(2:6); hydroxy-, mercapto-, amino- or halogen-alkyl such as 2-hydroxyethyl, 2- or 3-hydroxypropyl, 2-mercaptoethyl, 2-aminoethyl or 2-chlorethyl; as cycloaliphatic or cycloaliphatic-aliphatic radicals there may be mentioned, for example, cyclopentyl, cyclohexyl, cyclopentenyl, cyclohexenyl, 2-cyclopropylethyl, cyclopentyl or cyclohexylmethyl- or ethyl.

The acyl radicals listed also as suitable substituents for the sulfamyl group are, for example, those mentioned as suitable substituents for the hydrazino group and the amino group.

The new compounds possess valuable chemotherapeutic properties, They act above all against gram-positive and gram-negative pathogens, particularly against Staphylococci and Pneumococci as well as against mycobacteria and can therefore be used pharmacologically in animals or as medicaments. They are also suitable as additives to animal fodder and as intermediates for the manufacture of other valuable chemotherapeuticals.

Especially valuable are the compounds of the formula

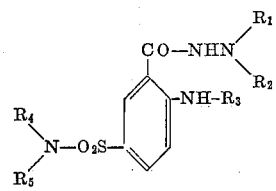

(I)

and their salts, where $R_1$ and $R_2$ are hydrogen atoms or lower aliphatic radicals or may represent a double bound aliphatic radical or a hydrogen atom and an acyl radical of a lower aliphatic carboxylic acid; $R_3$ is hydrogen or the acyl radical of a lower aliphatic carboxylic acid; and $R_4$ is a lower aliphatic hydrocarbon radical or a lower aliphatic acyl radical and $R_5$ is hydrogen or a lower aliphatic hydrocarbon radical; and more especially compounds of the formula

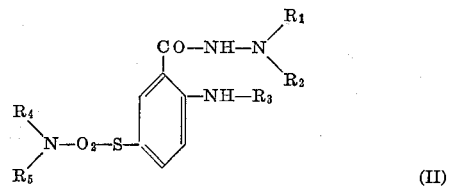

(II)

in which $R_3$ to $R_5$ have the meanings given for Formula I and $R_1$ and $R_2$ together represent a cycloalkylidene or an oxa-, aza- or thia-cycloalkylidene radical, and their salts. Of particular importance also are the compounds of the formula

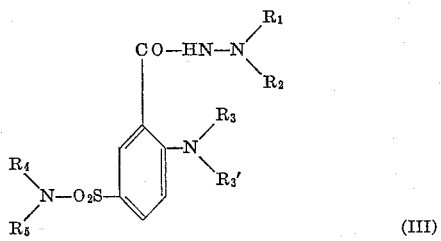

where $R_1$ and $R_2$ are hydrogen atoms or lower aliphatic radicals or represent a doubly-bound aliphatic radical or a hydrogen atom and an acyl radical of a lower aliphatic carboxylic acid, and at least one of the radicals $R_3$ and $R_3'$ represents a lower aliphatic radical, above all a lower alkyl or hydroxyalkyl radical and the other may represent hydrogen and $R_4$ represents a lower alkyl or hydroxyalkyl radical and $R_5$ represents hydrogen or a lower alkyl or hydroxyalkyl radical. Furthermore, compounds of the formula

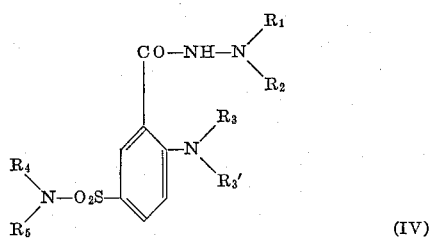

in which $R_3$, $R_3'$, $R_4$ and $R_5$ have the meanings given for Formula III and $R_1$ and $R_2$ together represent a cycloalkylidene or an oxa-, aza- or thia-cycloalkylidene radical, and their salts.

Special mention among compounds of the Formula I deserve those in which $R_1$ to $R_3$ represent hydrogen and $R_4$ a lower alkyl radical and $R_5$ hydrogen or a lower alkyl radical, and also those in which $R_1$ may also represent a lower alkyl and $R_1$ and $R_3$ also lower aliphatic acyls, and above all those in which $R_1$ is hydrogen, $R_2$ hydrogen or a lower alkyl or a lower aliphatic acyl, $R_3$ is hydrogen or a lower aliphatic acyl and one of the radicals $R_4$ and $R_5$ is a lower alkyl and the other is hydrogen or a lower alkyl, such as preferably the 5-methylsulfamyl-anthranilic acid hydrazide, 5-dimethylsulfamyl-anthranilic acid hydrazide or 5-diethylsulfamyl-anthranilic acid hydrazide and 5-dimethylsulfamyl - N - acetyl-anthranilic acid hydrazide and their salts. Further mention deserve those compounds of the Formula III in which $R_1$ is hydrogen or a lower alkyl, $R_2$ is hydrogen, or $R_1$ and $R_2$ together represent a lower alkylidene radical, $R_3$ is hydrogen or a lower alkyl, and $R_3'$ is a lower alkyl, and one of the radicals $R_4$ and $R_5$ is a lower alkyl and the other is hydrogen or a lower alkyl, and more especially the 2-methylamino- or 2 - dimethylamino - 5 - (dimethylsulfamyl)-benzoic acid hydrazide and their salts.

The invention primarily relates to the compounds of the formulae

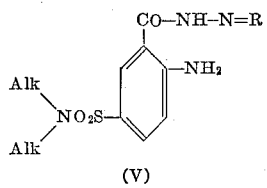 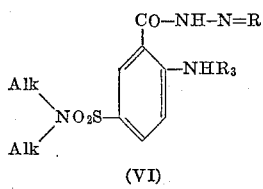

in which R represents an azacycloalkylidene radical, Alk represents a lower alkyl radical and $R_3$ a lower alkyl radical or a lower alkanoyl radical, and their salts, and more especially compounds of the formulae

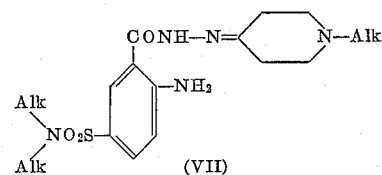

and

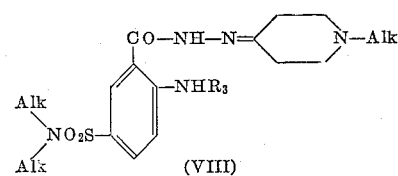

in which "Alk" represents lower alkyl radicals and $R_3$ stands for a lower alkyl radical or a lower alkanoyl radical and their salts, particularly the 5-dimethylsulfamyl-anthranilic acid - N'-(N-methyl-piperidylidene-4)-hydrazide and its salts.

The new compounds are manufactured by known methods; thus a 5-sulfamyl-2-amino-benzoic acid lower alkyl ester, such as the ethyl ester, whose sulfamyl group may be substituted by at least a lower aliphatic hydrocarbon radical, which may also be interrupted by hetero atoms or substituted by free hydroxyl, mercapto or amino groups or halogen atoms, or is substituted by at least one cycloaliphatic or cycloaliphatic-aliphatic radical or acyl radical is reacted with a hydrazine, or a corresponding 5-sulfamyl-2-chloro-benzoic acid hydrazide is reacted with ammonia or an amine containing at least one hydrogen atom at the nitrogen atom.

The reaction of the aforementioned compounds with the hydrazine is carried out in known manner, preferably in the presence of a solvent or diluent, in the presence or absence of a reaction accelerator, at room temperature or preferably at an elevated temperature, when necessary under superatmospheric pressure and/or in an inert gas, for example nitrogen. The exchange of the chlorine atom for the amino group is also carried out in a manner known per se, preferably at an elevated temperature and if necessary in a closed vessel.

In a resulting compound further substituents may be introduced in known manner, or a substituent already present may be converted or eliminated. Thus, for example, a resulting acylatable compound may be acylated or a resulting acyl compound hydrolyzed in known manner. The other above-mentioned nitrogen substituents may likewise be introduced, for example by reaction with a reactive ester of the alcohol concerned or, if desired, with a suitable carbonyl compound. For example, particularly unsubstituted hydrazides may be converted into hydrazones by reaction with a ketone, for example, tertiary amino-lower alkanones, such as a tertiary-amino-acetone or an N-alkyl-piperidone. Any residues linked by a double bond to the hydrazino group, for example, can be converted by reduction into singly bound radicals or they may be eliminated by hydrolysis.

The afore-mentioned reactions are carried out in conventional manner, in the presence or absence of diluents, condensing agents and/or catalysts, at room temperature or below or above it, if desired under superatmospheric pressure and/or in an inert gas.

The afore-mentioned starting materials—namely the sulfamylbenzoic acids or their reactive functional derivatives whose nucleus contains an amino, nitro or azo group or a halogen atom and, if desired, also the other nuclear substituents mentioned above—can insofar as they are new, be prepared by known methods, for example by the method described in Example 1 below or obvious modification thereof.

For example, the starting materials of the formula

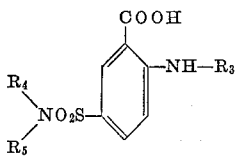

and their esters, particularly the alkyl esters, such as the methyl ester, are new, in which formula $R_3$ represents hydrogen or a lower alkyl or hydroxyalkyl radical and $R_4$ represents a lower alkyl or hydroxyalkyl radical and $R_5$ represents hydrogen or has the same meaning as $R_4$, and compounds of the formula

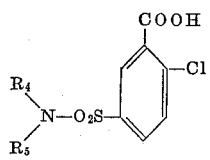

in which $R_4$ and $R_5$ have the meanings given above, and their esters, especially the alkyl esters, such as the methyl ester, and their hydrazides, and, if desired, their salts.

Depending on the reaction conditions and starting materials used the new compounds are obtained in the free form or in the form of their salts. The salts of the new compounds can be converted in known manner into the free compounds, acid addition salts, for example, by reaction with a basic agent. On the other hand, a resulting free base can form salts with inorganic or organic acids. Acid addition salts are preferably prepared with therapeutically useful acids, for example hydrohalic acids, for example hydrochloric or hydrobromic acid, perchloric, nitric or thiocyanic acid, a sulfuric or phosphoric acid; or organic acids such as formic, acetic, propionic, glycollic, lactic, pyruvic, oxalic, malonic, succinic, maleic, fumaric, malic, tartaric, citric, ascorbic, hydroxymaleic or dihydroxymaleic, benzoic, phenylacetic, 4-aminobenzoic, 4-hydroxybenzoic, anthranilic, cinnamic, mandelic, salicyclic, 4-aminosalicyclic, 2-phenoxybenzoic, 2-acetoxybenzoic, methane-sulfonic, ethane-sulfonic, hydroxyethanesulfonic, benzenesulfonic, paratoluenesulfonic, naphthalenesulfonic or sulfanilic acid; or methionine, tryptophan, lysine or arginine. The salts may be monosalts or polysalts. The method of preparation of the salts may also be used for purifying the new compounds. Compounds containing acid groups may be converted into salts thereof with metals, such as alkali metals, alkaline earth metals or earth metals.

The new compounds are intended for use as medicaments in the form of pharmaceutical preparations which contain said compounds in conjunction with an organic or inorganic, solid or liquid pharmaceutical excipient suitable for local, enteral, (for example oral) or parenteral administration. Suitable excipients are substances that do not react with the new compounds such, for example, as water, gelatine, lactose, starch, magnesium stearate, talc, vegetable oils, benzyl alcohols, gums, polyalkylene glycols, white petroleum jelly, cholesterol or other known medicinal excipients. The pharmaceutical preparations may be, for example, tablets, dragees or capsules, or in liquid form solutions, suspensions or emulsions. They may be sterilized and/or may contain assistants such as preserving, stabilizing, wetting or emulsifying agents, salts for regulating the osmotic pressure or buffers. They may also contain further therapeutically valuable substances.

The new compounds can also be used in animal husbandry in the form of animal fodder or as additives to animal fodder, for example in admixture with the conventional extenders or diluents or feedstuffs.

The following examples illustrate the invention.

Example 1

A solution of 22.4 grams of 5-dimethylsulfamyl-anthranilic acid methyl ester and 40 cc. of hydrazine hydrate in 600 cc. of ethanol is heated for 2 hours at the boil, then evaporated to dryness under vacuum, and the residue is crystallized from 900 cc. of ethanol. The resulting 5-dimethylsulfamyl-anthranilic acid hydrazide of the formula

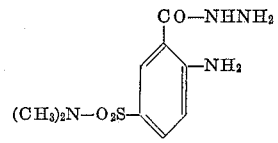

is obtained in colorless crystals melting at 204–206° C.

The starting material is prepared as follows:

170 grams of 2-chlorobenzoic acid-5-sulfonylchloride are slowly stirred at room temperature into a mixture of 260 grams of aqueous dimethylamine solution of 40% strength and 740 cc. of water. The mixture is stirred for another 30 minutes at room temperature, then adjusted with concentrated hydrochloric acid to pH=2, and the precipitated 5 - dimethylsulfamyl - 2-chlorobenzoic acid (melting at 172–175° C.) is filtered off.

142 grams of 5-dimethylsulfamyl-2-chlorobenzoic acid, 700 cc. of concentrated aqueous ammonia and 2.5 grams of copper powder are heated in an autoclave for 10 hours at 125 to 130° C. The reaction solution is then suction-filtered to remove any impurities and copper powder, the filtrate is adjusted with 700 cc. of concentrated hydrochloric acid to pH=5, and the precipitate is suctioned off. In this manner 5-dimethylsulfamyl-anthranilic acid, melting at 202–204° C., is obtained.

252 grams of 5-dimethylsulfamyl-anthranilic acid are added to a solution of 200 grams of sulfuric acid of 100% strength in 750 cc. of methanol, and the mixture is heated for 16 hours at the boil. The reaction solution is allowed to cool, and made up with water and ice, while stirring, to a volume of 5 liters, and the precipitate is suctioned off and suspended in 4 liters of water. The suspension is adjusted with 2 N-sodium carbonate solution to pH=10, filtered, and the residue is rinsed with water, to yield 5-dimethylsulfamyl-anthranilic acid methyl ester in the form of white crystals melting at 132–133° C.

Example 2

14.3 grams of 5-diethylsulfamyl-anthranilic acid methyl ester and 25 cc. of hydrazine hydrate in 375 cc. of absolute ethanol are refluxed for 2 hours. The reaction solution is then evaporated under vacuum and the residue is recrystallized from ethanol, to yield 5-diethylsulfamyl-anthranilic acid hydrazide of the formula

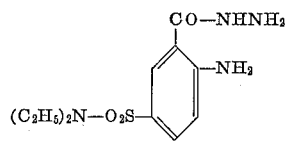

melting at 131–133° C.

The 5-diethylsulfamyl-anthranilic acid methyl ester used as starting material is prepared in the same manner as the 5-dimethylsulfamyl-anthranilic acid methyl ester described in Example 1; the intermediates obtained in this manner have the following melting points:

|  | ° C. |
|---|---|
| 5-diethylsulfamyl-2-chlorobenzoic acid | 132–135 |
| 5-diethylsulfamyl-anthranilic acid | 217–219 |
| 5-diethylsulfamyl-anthranilic acid methyl ester | 91–93 |

Example 3

10 grams of 5-dimethylsulfamyl-anthranilic acid hydrazide and 7 grams of 3-piperidino-butanone-(2) are heated for 2 hours in 100 cc. of methanol at 70° C. The reaction mixture is evaporated under reduced pressure and the residue crystallized from methanol. There is obtained 5-dimethylsulfamyl-anthranilic acid - N'-(1-piperidino-butylidene-3)-hydrazide of the formula

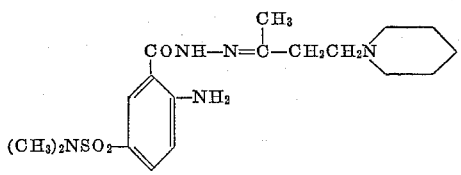

in the form of crystals melting at 170–172° C.

Example 4

A mixture of 8 grams of 5-dimethylsulfamyl-anthranilic acid methyl ester and 40 cc. of methylhydrazine is refluxed for 3 hours, then evaporated to dryness under vacuum; the residue is mixed with 50 cc. of water, adjusted with 5 N-hydrochloric acid to pH=1, the 5-dimethylsulfamyl-anthranilic acid (formed as byprduct) is suctioned off, and the filtrate is adjusted with concentrated sodium hydroxide solution to pH=6.5 to 7, whereupon once more a white precipitate forms which is dissolved and reprecipitated from water, to yield 5-dimethylsulfamyl-anthranilic acid methylhydrazide in white crystals melting at 104–106° C.

Example 5

A mixture of 4 grams of 5-dimethylsulfamyl-2-chlorobenzoic acid hydrazide and 50 cc. of liquid dimethylamine is heated in a closed tube for 6 hours at 90–100° C. The excess dimethylamine is evaporated and the residue recrystallized from water, to yield 5-dimethylsulfamyl-2-dimethylamino-benzoic acid hydrazide of the formula

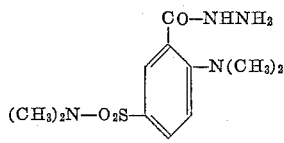

in white crystals melting at 116–118° C.

The 5-dimethylsulfamyl-2-chlorobenzoic acid hydrazide used as starting material is obtained from 5-dimethylsulfamyl-2-chlorobenzoic acid by esterification with methanol in the presence of sulfuric acid of 100% strength and reacting the ester with hydrazine hydrate in the conventional manner.

Example 6

A mixture of 8 grams of 5-dimethylsulfamyl-2-chlorobenzoic acid hydrazide and 70 cc. of liquid monomethylamine is heated in a closed tube for 6 hours at 90–100° C. The excess methylamine is evaporated and the residue is added to 50 cc. of water. The batch is strongly acidified with 2 N-hydrochloric acid, a small amount of undissolved matter is suctioned off and the filtrate is adjusted with concentrated sodium hydroxide solution to pH=7, whereupon a crystalline precipitate forms which is recrystallized from hot alcohol, to yield 5-dimethylsulfamyl-2-methyl-aminobenzoic acid hydrazide of the formula

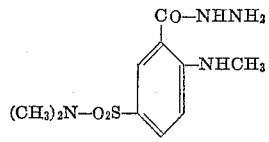

in white crystals melting at 219–221° C.

Example 7

24.4 grams of 5-methylsulfamyl-anthranilic acid methyl ester and 50 cc. of hydrazine hydrate in 700 cc. of absolute alcohol are refluxed for 2 hours. The reaction solution is then evaporated to dryness on a water bath. When the residue is triturated with warm water, it begins to crystallize. The crystals are suctioned off and recrystallized from alcohol, to yield 5-methylsulfamyl-anthranilic acid hydrazide of the formula

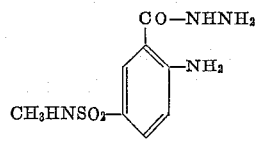

melting at 160 to 161° C.

The 5-methylsulfamyl-anthranilic acid methyl ester used as starting material is prepared in the same manner as the 5-dimethylsulfamyl-anthranilic acid methyl ester described in Example 1, and the resulting intermediates have the following melting points:

| | ° C. |
|---|---|
| 5-methylsulfamyl-2-chlorobenzoic acid | 170–172 |
| 5-methylsulfamyl-anthranilic acid | 207–209 |
| 5-methylsulfamyl-anthranilic acid methyl ester | 135–137 |

Example 8

5 grams of 5-dimethylsulfamyl-anthranilic acid hydrazide are rapidly dissolved by heating at 40 to 50° C. in 50 cc. of acetic anhydride. The whole is then cooled with ice water, and the precipitated crystals are suctioned off and recrystallized from much ethanol, to yield 5-dimethylsulfamyl - anthranilic acid-N'-acetyl hydrazide in white crystals melting at 231–232° C.

Example 9

A mixture of 5 grams of dimethylsulfamyl-2-ethylaminobenzoic acid methyl ester and 15 cc. of hydrazine hydrate is refluxed for 2 hours, then evaporated to dryness under vacuum, the residue is triturated with water, and the precipitated crystals are suctioned off and recrystallized from a small amount of alcohol, to yield 5-dimethylsulfamyl-2-ethylaminobenzoic acid hydrazide of the formula

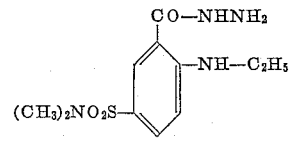

in white crystals melting at 179–180° C.

The starting material is obtained by reacting 5-dimethylsulfamyl-2-chlorobenzoic acid with ethylamine as described in Example 5, followed by esterification of the resulting 5-dimethylsulfamyl - 2 - ethylaminobenzoic acid (melting at 192–193° C.) with methanol, as described in Example 1, to give the 5-dimethylsulfamyl-2-ethylamino-benzoic acid methyl ester melting at 126–127° C.

Example 10

15 grams of 5-dimethylsulfamyl-anthranilic acid hydrazide were suspended in 450 cc. of absolute ethanol, and 10 grams of N-methyl-4-piperidone are added at 80° C., while stirring. After stirring the mixture for 16 hours at that temperature, the mixture is cooled in an ice bath, and the slightly brown lamellae are filtered off, and there is obtained pure 5-dimethylsulfamyl-anthranilic acid N'-(N-methyl-piperidylidene-4)-hydrazide of the formula

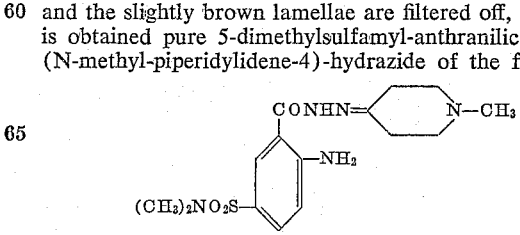

which melts at 236–238° C. with decomposition. The hydrochloride of this base can be prepared as follows: A suspension of 6 grams of the base in 70 cc. of ethanol is mixed with the calculated quantity of hydrogen chloride in methanol, whereupon dissolution is complete. After a short time the hydrochloride precipitates as a white powder, which melts at 212° C. with decomposition.

In a similar manner there are obtained:
5-dimethylsulfamyl-anthranilic acid-N' - (N-isopropyl-piperidylidene-4)-hydrazide, M.P. 203–204° C.; 5-dimethylsulfamyl-anthranilic acid-N'-(N-isobutyl-piperidylidene-4) hydrazide, M.P. 196–197° C.; 5-dimethylsulfamyl-anthranilic acid-N' - (N-benzyl-piperidylidene-4) - hydrazide, M.P. 204–205° C.; 5-dimethylsulfamyl-anthranilic acid-N'-(N-secondary butyl-piperidylidene-4)-hydrazide, M.P. 195–196° C.

Example 11

A solution of 3 grams of 5-dimethylsulfamyl-anthranilic acid hydrazide in 300 cc. of acetone is evaporated to dryness. The residue is crystallized from ethanol, to yield 5-dimethylsulfamyl-anthranilic acid isopropylidene hydrazide of the formula

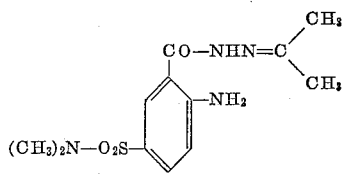

in white crystals melting at 204 to 206° C.

Example 12

A mixture of 6 grams of 5-dimethylsulfamyl-2-(β-hydroxyethylamino)-benzoic acid methyl ester and 18 cc. of hydrazine hydrate is refluxed for 2 hours, then evaporated to dryness under vacuum; a small amount of water is added, the batch is adjusted with N-hydrochloric acid to pH=7 to 8, the crystals formed are suctioned off, and recrystallized from ethanol, to yield 5-dimethylsulfamyl-2-(β-hydroxymethylamino)-benzoic acid hydrazide of the formula

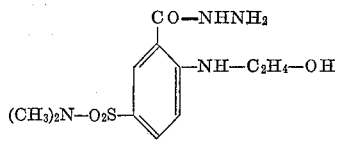

in white crystals melting at 154 to 156° C.

The starting material is prepared as described in Example 1:

| | Melting at ° C. |
|---|---|
| 5-dimethylsulfamyl-2 - (β-hydroxyethylamino)-benzoic acid | 172–174 |
| 5-dimethylsulfamyl-2 - (β-hydroxyethylamino)-benzoic acid methyl ester | 108–110 |

Example 13

A solution of 13.7 grams of 5-[N-(β-hydroxyethyl)-sulfamyl]-anthranilic acid methyl ester and 25 cc. of hydrazine hydrate in 375 cc. of ethanol is heated for 2 hours at the boil, then evaporated to dryness under vacuum, and the residue is mixed with N-hydrochloric acid to establish a pH value of 6 to 6.5, whereupon on prolonged standing a white crystalline precipitate forms which is recrystallized from ethanol, to yield 5-[N-(β-hydroxyethyl)-sulfamyl]-anthranilic acid hydrazide of the formula

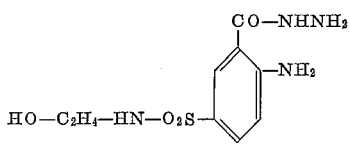

in white crystals melting at 142 to 143° C.

The starting material is manufactured as described in Example 1 and there are obtained:

| | Melting at ° C. |
|---|---|
| 5-[N-(β-hydroxyethyl) - sulfamyl]-2-chlorobenzoic | 164–166 |
| 5-[N-(β-hydroxyethyl) - sulfamyl] - anthranilic acid | 184–186 |
| 5-[N-(β-hydroxyethyl) - sulfamyl] - anthranilic acid methyl ester | 129–131 |

Example 14

A solution of 9.6 grams of 5-[N:N-di-(β-hydroxyethyl)-sulfamyl]-anthranilic acid methyl ester and 15 cc. of hydrazine hydrate in 250 cc. of ethanol is heated for 2 hours at the boil, then evaporated to dryness under vacuum and the residue is crystallized from ethanol, to yield 5 - [N:N-di-(β-hydroxyethyl)-sulfamyl]-anthranilic acid hydrazide of the formula

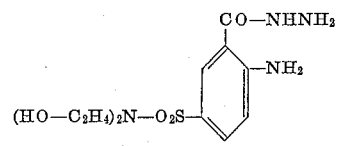

in white crystals melting at 160–162° C.

The starting material is manufactured at described in Example 1, and there are obtained:

| | Melting at ° C. |
|---|---|
| 5 - [N:N - di - (β-hydroxyethyl)-sulfamyl]-2-chlorobenzoic acid | 142–144 |
| 5 - [N:N - di - (β - hydroxyethyl) - sulfamyl]-anthranilic acid | 194–195 |
| 5 - [N:N - di - (β - hydroxyethyl)-sulfamyl]-anthranilic acid methyl ester | 161–163 |

Example 15

A mixture of 2 grams of 5-dimethylsulfamyl-2-n-butylaminobenzoic acid methyl ester and 6 cc. of hydrazine hydrate is refluxed for 2 hours, then evaporated to dryness under vacuum, and the residue is recrystallized from a small amount of ethanol, to yield 5-dimethylsulfamyl-2-n-butyaminobenzoic acid hydrazide of the formula

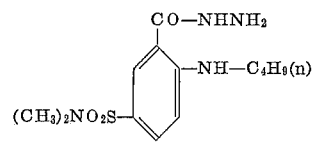

in white crystals melting at 147–148° C.

The starting material is obtained by reacting 5-dimethlylsulfamyl-2-chlorobenzoic acid with a n-butylamine as described in Example 5 to from 5-dimethylsulfamly-2-n-butylaminobenzoic acid (melting at 190–192° C.) and esterification with methanol as described in Example 1, to yield 5-dimethylsulfamyl-2-n-butylaminobenzoic acid methyl ester melting at 88—89° C.

Example 16

A mixture of 2 grams of 5-dimethylsulfamyl-2-isopropylaminobenzoic acid methyl ester and 8 cc. of hydrazine hydrate is refluxed for 2 hours, then evaporated to dryness under vacuum, and the residue is recrystallized from a small amount of ethanol, to yield 5-dimethylsulfamyl-2-isopropylaminobenzoic acid hydrazide of the formula

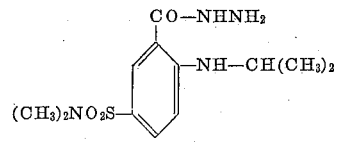

in white crystals melting at 144–145° C.

The starting material is obtained by converting 5-dimethylsulfamyl-2-chlorobenzoic acid, as described in Example 5, to 5-dimethylsulfamyl-2-isopropylaminobenzoic acid (melting at 195–198° C.) and esterification with methanol, as described in Example 1, to give 5-dimethylsulfamyl-2-isopropylaminobenzoic acid methyl ester melting at 104–106° C.

Example 17

A suspension, heated to 80° C., of 10 grams of 5-dimethylsulfamyl-anthranilic acid hydrazide in 300 cc. of absolute ethanol is mixed with 10 grams of morpholino-acetone while stirring, and the whole is further stirred at that temperature for 16 hours, whereby a clear solution is obtained. The solution is then evaporated in vacuo to a volume of 80 cc., and upon cooling slightly brown crystals precipitate. By recrystallization of the product from a mixture of ethanol and petroleum ether, there is obtained 5-dimethylsulfamylanthranilic acid - N' - (1-morpholino-propylidene-2)-hydrazide of the formula

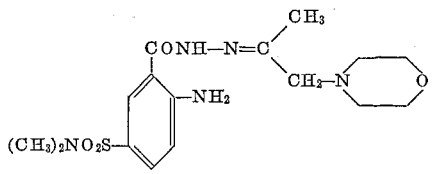

it melts at 174–176° C. with decomposition.

By the same process there can be obtained from 10 grams of 5-dimethylsulfamyl-anthranilic acid hydrazide and 10 grams of piperidino-acetone 5-dimethylsulfamyl-anthranilic acid - N' - (1 - piperidino - propylidene - 2)-hydrazide of the formula

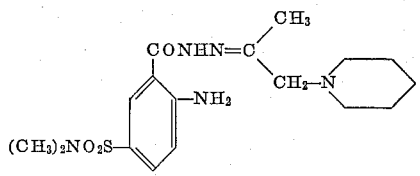

melting at 183–184° C. with decomposition.

Example 18

A mixture of 5 grams of 5-ethylsulfamyl-anthranilic acid methyl ester and 50 cc. of hydrazine hydrate is refluxed for 2 hours, then evaporated under vacuum, the residue is mixed with 30 cc. of water, the whole is adjusted with 2 N-hydrochloric acid to pH=7, and the separated oil is taken up in ethyl acetate. The ethyl acetate layer is isolated, dried over magnesium sulfate and evaporated under vacuum. The oily residue is dissolved in absolute ethanol and mixed with the calculated amount of hydrochloric acid in ethanol, whereupon a white precipitate forms which is recrystallized from ethanol+ether, to yield 5-ethylsulfamyl-anthranilic acid hydrazide hydrochloride of the formula

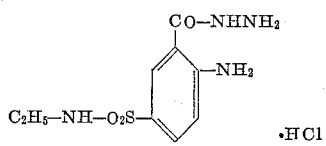

in white crystals melting at 240 to 241° C. with decomposition.

The 5-ethylsulfamyl-anthranilic acid methyl ester used as starting material in this example is prepared in the following manner:

100 grams of 2-chlorobenzoic acid-5-sulfochloride are stirred at room temperature into a solution of 80 grams of ethylamine in 600 cc. of water. The batch is stirred on for 2 hours, then treated with animal carbon, filtered, and the filtrate is acidified with concentrated hydrochloric acid while being stirred and cooled with ice. The white precipitate is filtered off and crystallized from aqueous ethanol, to yield 2-chloro-5-ethylsulfamyl-benzoic acid melting at 186–190° C.

A mixture of 60 grams of this acid, 700 cc. of concentrated ammonia solution and 2 grams of copper powder is heated in an autoclave for 12 hours at 125–130° C., allowed to cool, filtered, and the ammoniacal solution is poured with stirring and ice-cooling into a sufficiency of concentrated hydrochloric acid to ensure that at the end the reaction mixture is just acid to Congo red. The precipitate is filtered off and recrystallized from aqueous ethanol, to yield 5-ethylsulfamyl-anthranilic acid melting at 202 to 203° C.

30 grams of this amino acid are added to a solution of 25 cc. of sulfuric acid monohydrate in 90 cc. of methanol and refluxed for 16 hours, then cooled to room temperature, poured over ice, and the solid precipitate is taken up in chloroform. The chloroform layer is washed with sodium bicarbonate solution, dried over magnesium sulfate and evaporated under vacuum. Recrystallization of the solid residue from isopropanol+petroleum ether yields 5-ethylsulfamyl-anthranilic acid methyl ester melting at 140 to 143° C.

Example 19

A mixture of 20 grams of 5-isopropylsulfamyl-anthranilic acid methyl ester, 40 cc. of hydrazine hydrate and 300 cc. of ethanol is refluxed for 2 hours, then evaporated under vacuum, and the residue is taken up in ethanol and mixed with water until crystallization sets in. The whole is allowed to cool and then filtered, 7.5 grams of starting material being recovered. The mother liquor is evaporated under vacuum, the residue is dissolved in water and adjusted with 2 N hydrochloric acid to pH=7 and cooled to 0° C., whereupon a white crystalline precipitate forms; it is recrystallized from water, to yield 5-isopropylsulfamyl-anthranilic acid hydrazide of the formula

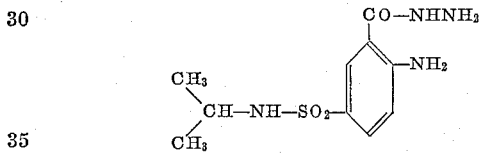

in white crystals melting at 82–84° C.

The 5-isopropylsulfamyl-anthranilic acid methyl ester used as starting material in this example is prepared by the method described in Example 18 for the manufacture of 5-ethylsulfamyl-antharnilic acid methyl ester. When 2-chlorobenzoic acid-5-sulfochloride is reacted with an aqueous isopropylamine solution the 2-chloro-5-isopropylsulfamyl-benzoic acid (melting at 168–170° C.) is obtained. The 5-isopropylsulfamyl-anthranilic acid prepared therefrom melts at 230–233° C. and its methyl ester at 132–135° C.

Example 20

A mixture of 5 grams of 5-(N-ethyl-N-methyl-sulfamyl)-anthranilic acid methyl ester, 10 cc. of hydrazine hydrate and 100 cc. of ethanol is refluxed for 3 hours, then evaporated under vacuum, the residue is dissolved with heating in ethanol and water is added until crystallisation sets in. The whole is allowed to cool and filtered. The resulting solid substance still contains some starting material; it is suspended in 15 cc. of ethanol, filtered and rinsed on the filter with ether. Recrystallization from ethanol+petroleum ether yields 5-(N-ethyl-N-methylsulfamyl)-anthranilic acid hydrazide of the formula

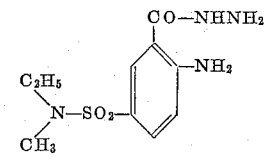

in white crystals melting at 172–175° C.

The 5 - (N - ethyl-N-methylsulfamyl)-anthranilic acid methyl ester used as starting material in this example is prepared in the following manner:

A solution of 70 grams of 2-chloro-5-ethylsulfamyl-benzoic acid in 450 cc. of methanol is mixed with 53 cc. of 10 N-sodium hydroxide solution, whereupon at 50° C. 100 grams of dimethyl sulfate are stirred in dropwise.

Within 20 minutes, 66 cc. of 10 N-sodium hydroxide solution are added to maintain the reaction mixture alkaline. After said time another 100 grams of dimethyl sulfate are added and the mixture is boiled for 4 hours at 50 to 60° C., while maintaining the reaction mixture at an alkaline reaction by adding 80 cc. of 10 N-sodium hydroxide solution in small portions. The bulk of methanol is then distilled off under vacuum and the aqueous solution is acidified with 2 N-hydrochloric acid while being cooled with ice. The white precipitate formed is recrystallized from aqueous ethanol, to yield 2-chloro-5-(N-ethyl-N-methylsulfamyl)-benzoic acid melting at 132–135° C.

A mixture of 72 grams of the above acid, 700 cc. of concentrated ammonia solution and 1.5 grams of copper powder is heated in an autoclave for 12 hours at 125–130° C. Working up according to Example 18 yields 5-(N-ethyl-N-methylsulfamyl)-anthranilic acid melting at 184–185° C. which, on being boiled with methanol in the presence of sulfuric acid monohydrate, yields the 5-(N-ethyl-N-methyl-sulfamyl)-anthranilic acid methyl ester melting at 92 to 94° C.

Example 21

A mixture of 5 grams of 5-(N-isopropyl-N-methylsulfamyl)-anthranilic acid methyl ester and 50 cc. of hydrazine hydrate is refluxed for 2 hours, then evaporated under vacuum and water is added. On trituration, a solid precipitate forms which is recrystallized from aqueous ethanol, to yield 5-(N-isopropyl-N-methylsulfamyl)-anthranilic acid hydrazide of the formula

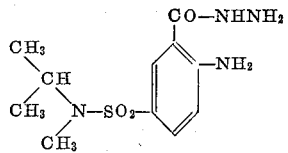

in white crystals melting at 130 to 132° C.

The 5 - (N - isopropyl-N-methylsulfamyl) - anthranilic acid methyl ester used as starting material in this example is prepared by the method described in Example 20 for the preparation of 5-(N-ethyl-N-methylsulfamyl)-anthranilic acid methyl ester. When 2-chloro-5-isopropyl-sulfamyl-benzoic acid is treated with dimethyl sulfate in the presence of sodium hydroxide solution, it yields 2-chloro-5-(N-isopropyl - N - methylsulfamyl)-benzoic acid melting at 156–159° C. which, on reaction with ammonia in the presence of copper powder, yields 5-(N-isopropyl-N-methylsulfamyl)-anthranilic acid melting at 235–238° C. and on esterification with methanol and sulfuric acid monohydrate the 5-(N-isopropyl-N-methylsulfamyl)-anthranilic acid methyl ester melting at 125–129° C.

Example 22

A mixture of 6 grams of 3-methyl-5-dimethylsulfamyl-anthranilic acid methyl ester and 100 cc. of hydrazine hydrate is refluxed for 2½ hours, then cooled, upon which a crystalline precipitate forms which is recrystallized from aqueous ethanol, to yield 3-methyl-5-dimethylsulfamyl-anthranilic acid hydrazide of the formula

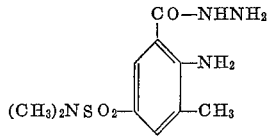

in white crystals melting at 246–250° C.

The 3 - methyl - 5 - dimethylsulfamyl-anthranilic acid methyl ester used as starting material in this example is prepared in the following manner:

50 grams of 2 chloro-3-methylbenzoic acid are stirred within 30 minutes into 60 grams of chlorosulfonic acid, with the internal temperature rising from 22 to 30° C. The batch is then stirred for another 4 hours at 95–100° C. The reaction solution is cooled to 30° C. and poured with stirring over 400 grams of ice, and the solid precipitate is filtered off and rinsed on the filter with ice water and dried under vacuum at 60° C., to yield crude 2-chloro-3-methyl-benzoic acid-5-sulfochloride melting at 173–175° C.

A mixture of 100 cc. of aqueous dimethylamine solution of 40% strength and 300 cc. of water is mixed portionwise with 51 grams of the sulfochloride described above, and the whole is stirred for 2 hours at room temperature. The whole is filtered and the filtrate is acidified with 40 cc. of concentrated hydrochloric acid while being cooled with ice. The precipitate is filtered off and recrystallized from aqueous ethanol to yield 2-chloro-3-methyl-5-dimethyl-sulfamyl-benzoic acid melting at 191–192° C.

A mixture of 60 grams of this acid, 700 cc. of concentrated ammonia solution and 1.5 grams of copper powder is heated in an autoclave for 12 hours at 125–130° C., then allowed to cool and filtered, and the ammoniacal solution is poured into a sufficiency of concentrated hydrochloric acid to ensure that the reaction mixture is just slightly acid to Congo red. The solid precipitate is filtered off and recrystallized from aqueous ethanol, to yield 3-methyl-5-dimethylsulfamyl-anthranilic acid melting at 228 to 232° C.

30 grams of this amino acid are added to a solution of 25 cc. of sulfuric acid monohydrate in 90 cc. of methanol and refluxed for 16 hours, then cooled, poured over ice and extracted with methylene chloride. The organic layer is washed with sodium bicarbonate solution, dried with magnesium sulfate and evaporated under vacuum. The solid precipitate is then crystallized from isopropanol+petroleum ether, to yield 3-methyl-5-dimethylsulfamyl-anthranilic acid methyl ester melting at 165–170° C.

Example 23

12.9 grams of 5-dimethylsulfamyl-anthranilic acid hydrazide are mixed with 3.8 cc. of formaldehyde of 39.3% strength and a solution of 5.2 grams of sodium bisulfite in 10 cc. of water. The mixture is heated on a water bath for four hours. The somewhat turbid solution is then clarified by filtration, and the cooled solution is evaporated in a desiccator in vacuo over sulfuric acid, after which a crystalline residue remains behind. In this manner there is obtained the sodium salt of 5-dimethylsulfamyl-anthranilic acid N'-oxysulfonylmethyl-hydrazide of the formula

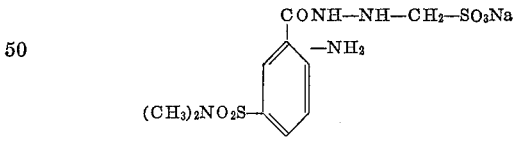

in the form of white crystals melting at 195° C. with decomposition.

What is claimed is:

1. A member selected from the group consisting of a compound of the formula

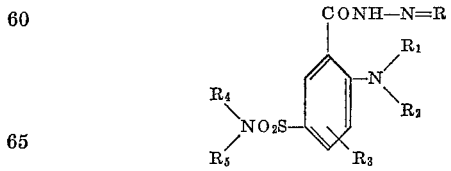

and an acid addition salt thereof, wherein R is a member selected from the group consisting of two hydrogen atoms, lower alkylidene, lower alkylidene substituted by a member selected from the group consisting of di-lower alkylamino, pyrrolidino, piperidino and morpholino, lower mono-oxa-cycloalkylidine, lower mono-aza-cyclo-alkylidene, N-lower alkyl-lower mono-aza-cycloalkylidene, N-benzyl-lower mono-aza-cycloalkylidene, and lower mono-thia-cycloalkylidene, each of said cycloalkylidene substituents having 5 to 6 ring members, $R_1$ is a member selected from the group consisting of hydrogen, lower alkyl and lower alkanoyl and $R_2$ is a member selected from the group consisting of hydrogen, lower alkyl, and hydroxy-lower alkyl, $R_3$ is a member selected from the group consisting of hydrogen, lower alkyl and lower alkoxy, $R_4$ is a member selected from the group consisting of hydrogen, lower alkyl and hydroxy-lower alkyl, and $R_5$ is a member selected from the group consisting of lower alkyl and hydroxy-lower alkyl.

2. 5-dimethylsulfamyl-anthranilic acid hydrazide.
3. 5-diethylsulfamyl-anthranilic acid hydrazide.
4. 5-dimethylsulfamyl-2-methylaminobenzoic acid hydrazide.
5. 5-dimethylsulfamyl-2-ethylaminobenzoic acid hydrazide.
6. 5-dimethylsulfamyl-anthranilic acid-N'-acetyl hydrazide.
7. 5 - dimethylsulfamyl-anthranilic acid-N'-(N-methyl-piperidylidene-4)-hydrazide.
8. A compound of the formula

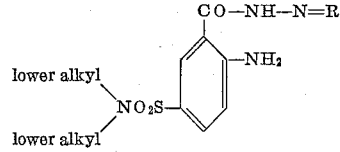

wherein R is piperidino-lower alkylidene.

9. A compound of the formula

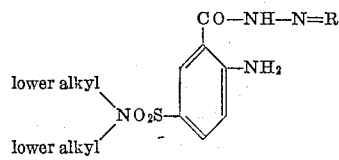

wherein R is N-lower alkyl-monoaza-lower cycloalkylidene, in which cycloalkylidene has 5 to 6 ring members.

10. A compound of the formula

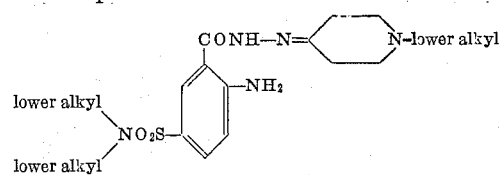

11. An acid addition salt of a compound of claim 8.
12. An acid addition salt of a compound of claim 9.
13. An acid addition salt of a compound of claim 10.
14. An acid addition salt of a compound of claim 2.
15. An acid addition salt of a compound of claim 6.
16. An acid addition salt of a compound of claim 7.

References Cited

UNITED STATES PATENTS

| | | | |
|---|---|---|---|
| 2,789,938 | 4/1957 | Wilcox et al. | 260—556 |
| 2,910,488 | 10/1959 | Novello | 260—397.7 |
| 2,987,517 | 6/1961 | Martin et al. | 260—293.4 |
| 3,014,906 | 12/1961 | Gadekar et al. | 260—240 |
| 3,043,874 | 7/1962 | De Wald et al. | 260—556 |
| 3,050,553 | 8/1962 | Novello | 260—515 |
| 3,055,905 | 9/1962 | Graf et al. | 260—294.8 |
| 3,120,523 | 4/1964 | Petersen et al. | 260—248 |

FOREIGN PATENTS 347,200 8/1960 Switzerland.

OTHER REFERENCES

Gadekar et al. II, J. Org. Chem., vol. 27, pp. 1383 to 1386 (April 1962).

Northey et al., The Sulfonamides and Allied Compounds, pp. 1–3, Reinhold Pub. Corp., New York (1948).

JOHN D. RANDOLPH, *Primary Examiner.*

NICHOLAS RIZZO, *Examiner.*

R. L. PRICE, *Assistant Examiner.*